United States Patent [19]
Takeuchi et al.

[11] 3,880,340
[45] Apr. 29, 1975

[54] APPARATUS FOR WELDING A FLANGE TO A PIPE

[75] Inventors: Tetsuo Takeuchi; Kaoru Shiozawa, both of Ichiharashi, Japan

[73] Assignee: Mitsui Shipbuilding and Engineering Co. Ltd., Tokyo, Japan

[22] Filed: May 13, 1974

[21] Appl. No.: 469,610

[30] Foreign Application Priority Data
May 14, 1973 Japan.............................. 48-53402

[52] U.S. Cl. .......................... 228/45; 228/4; 228/6; 228/25; 219/60 A; 219/125 R
[51] Int. Cl..... B23k 37/02; B23k 37/04; B23k 9/02
[58] Field of Search........... 228/25, 4, 6, 44, 45, 47, 228/48; 219/60 A, 125 R; 269/41, 37

[56] References Cited
UNITED STATES PATENTS
3,634,648   1/1972   Morris et al. ......................... 228/48
3,777,103   12/1973   White et al. ....................... 219/60 A FOREIGN PATENTS OR APPLICATIONS
282,693   5/1964   Netherlands.................... 219/125 R

*Primary Examiner*—Robert D. Baldwin
*Assistant Examiner*—Gus T. Hampilos
*Attorney, Agent, or Firm*—Dorfman, Herrell and Skillman

[57] ABSTRACT

Apparatus for regularly welding a tack welded flange to a pipe in which welding torches for welding outer corner on the pipe and inner corner of the flange are automatically positioned. To this end means for positioning the welding torch for welding the outer corner is provided and means for moving the welding torch for welding the inner corner according as the former welding torch is moved for positioning the latter welding torch.

1 Claim, 3 Drawing Figures

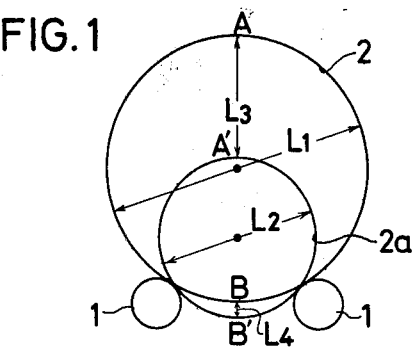
FIG.1
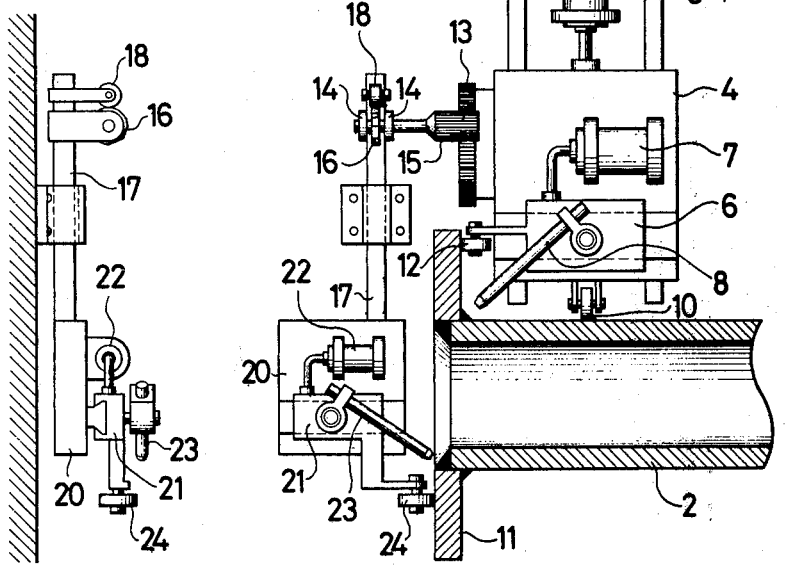
FIG.3
FIG.2

APPARATUS FOR WELDING A FLANGE TO A PIPE

This invention relates to an apparatus for regularly welding a tack welded flange to a pipe.

The object of the present invention is to provide a welding apparatus in which welding torches may be automatically brought to the predetermined positions when welding the flanges to the pipe, thus increasing the working efficiency and enabling the automation of the welding equipment.

According to the present invention, welding torches are adapted to be moved according to diameter of the pipe, so that the welding torches are properly brought to the welding positions. In the drawings;

FIG. 1 is a schematic illustration showing pipes of different diameters carried by supporting rollers;

FIG. 2 is a side view showing an apparatus according to the present invention; and FIG. 3 is a side view of the apparatus.

Referring to FIG. 1, a pipe 2 is supported by a pair of rollers 1, and flange (not shown) tack welded to the pipe is regularly welded to the outer and inner peripheral points A and B during the pipe 2 being rotated with rotation of the rollers. If the pipe 2 having a diameter $L_1$ is changed for a pipe 2a of a smaller diameter $L_2$, the welding points A, B are shifted to A', B' to be moved the differential distances $L_3$, $L_4$, respectively. This means that the welding torches designed for welding the flange to the inner and outer end corners must be shifted according to the pipe diameter by differential distances such as $L_3$ and $L_4$. However, the relation between the positions A and B is constant for a pipe of a kind having a given diameter. According to the present invention, the welding torches are placed in their precise welding points in such manner that welding point of the outer corner of the pipe 2 is detected first of all and welding point of the end inner corner of the pipe 2 is decided in accordance with the detected welding point of the outer corner.

Referring to FIGS. 2 and 3, an outer slide 4 is provided to be moved along a vertical guide frame 3. The slide is adapted to slide vertically by the action of a piston rod of a pneumatic cylinder 5. A second slide 6 provided with an outer welding torch 8 is slidably engaged in a horizontal guide groove of the slide 4 and associated operatively with a second pneumatic cylinder 7 for sliding in the axial direction of the pipe 2. A contact roller 10 is provided on the lower surface of the slide 4 for abutting on the upper surface of the pipe 2, while a second contact roller 12 is mounted on the lateral surface of the slide 4 for abutting on the inner side surface of the flange 11 tack welded to the pipe 2. The slide 4 has a vertical toothed rack 13 with which a pinion 15 is engaged. The pinion 15 is rotatably mounted on the machine frame by means of bearing means 14. On the shaft of the pinion 15 is secured a cam 16 with which a cam roller 18 provided on the upper part of a vertically movable rod 17 is engaged. The rod 17 is secured to a vertically movable inner first slide 20 on which a second slide 21 is provided to be slided along the horizontal guide by a pneumatic cylinder 22. The slide 21 carries an inner welding torch 23 for welding the inner corner and a contact roller 24 adapted for abutting on the outer side surface of the flange 11.

The apparatus of the present invention operates as follows:

The slides 4 and 6 and the slide table 21 are placed in retracted positions where rollers 10, 12 and 24 do not abut on the pipe and flange. Then, the pipe 2 with tack welded flange 11 is placed on the rollers 1 shown in FIG. 1. The slide 4 is lowered until the contact roller 10 abuts on the upper surface of the pipe. The cam 16 is rotated by the downward movement of the slide 4 through the rack 13 and pinion 15, so that the rod 17 is moved through cam roller 18 for moving the slide 20. The shift distance of the slide 4 is decided by the diameter of the pipe 2, while the position of the inner corner to be welded is also decided by the shift distance of the slide 4. Accordingly the contour of the cam 16 is so selected that the welding torch 23 is placed in the proper position for welding the inner corner formed by the inner surface of the flange and the end of the pipe. The slide 6 and the slide 21 are shifted to the left and right by the action of the pneumatic cylinders 7 and 22, respectively, until the contact rollers 8 and 23 abut on the flange surfaces. In these terminal positions for the slides, the welding torches 8 and 23 are brought to the welding points proximate to the outer and inner corners. Then, the rollers 1 are rotated to rotate the pipe thereby welding of the corners with the welding torches may be performed.

It will be apparent that, the welding torches may be brought to their optimum welding points for welding the pipes and flanges of different diameters.

What is claimed is:

1. An apparatus for welding an inner and outer corner of a flange previously tack welded to a pipe comprising an outer first slide mounted for sliding vertically above the pipe, an outer second slide mounted on said outer first slide for sliding perpendicular to said outer first slide along the axis of the pipe, a welding torch carried on said outer second slide for welding the outer flange-pipe corner, means for regulating the stop position for said outer first slide, means for regulating the stop position for said outer second slide, an inner first slide provided to be vertically moved at the position adjacent to the flange, an inner second slide mounted on said inner first slide for sliding perpendicular to said inner first slide along the axis of the pipe, a welding torch carried on said inner second slide for welding the inner flange-pipe corner, means for regulating the stop position of the inner second slide on the inner first slide, and means, including a cam, for operatively connecting said outer first slide to the inner first slide to vertically position the welding torch connected to said inner second slide at said inner second slide at said inner flange-pipe corner.

* * * * *